US006650336B2

(12) United States Patent
Suzuki

(10) Patent No.: US 6,650,336 B2
(45) Date of Patent: Nov. 18, 2003

(54) COLOR CONVERSION DEVICE AND METHOD CAPABLE OF IMPROVING COLOR REPRODUCTION

(75) Inventor: Hiroyuki Suzuki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 280 days.

(21) Appl. No.: 09/850,102

(22) Filed: May 8, 2001

(65) Prior Publication Data

US 2002/0008709 A1 Jan. 24, 2002

(30) Foreign Application Priority Data

May 17, 2000 (JP) ........................................ 2000-144481
Apr. 25, 2001 (JP) ........................................ 2001-128216

(51) Int. Cl.[7] .............................................. G09G 5/02
(52) U.S. Cl. ......................... 345/589; 345/604; 358/1.9
(58) Field of Search ............................. 345/589, 591, 345/600, 601, 603, 604, 606; 358/1.9

(56) References Cited

U.S. PATENT DOCUMENTS 5,581,376 A * 12/1996 Harrington .................. 345/518
6,151,135 A * 11/2000 Tanaka et al. ................ 345/1.9
6,268,867 B1 * 7/2001 Sato et al. ................... 345/589

FOREIGN PATENT DOCUMENTS

JP          11-328391         11/1999

* cited by examiner

Primary Examiner—Matthew Luu
(74) Attorney, Agent, or Firm—Burns, Doane, Swecker & Mathis, LLP

(57) ABSTRACT

A color conversion device capable of providing improved color reproduction through a color conversion process in which image data represented in a first color space are input to a three-dimensional LUT to output a plurality of color-converted data, a saturation level of the image data input is determined, a level of contribution of the color-converted data to an interpolation operation is modified based on a result of determination of a saturation level, and the interpolation operation is performed using the plurality of color-converted data having a level of contribution thus modified to obtain output image data represented in a second color space and corresponding to the image data input.

31 Claims, 19 Drawing Sheets

F I G. 5
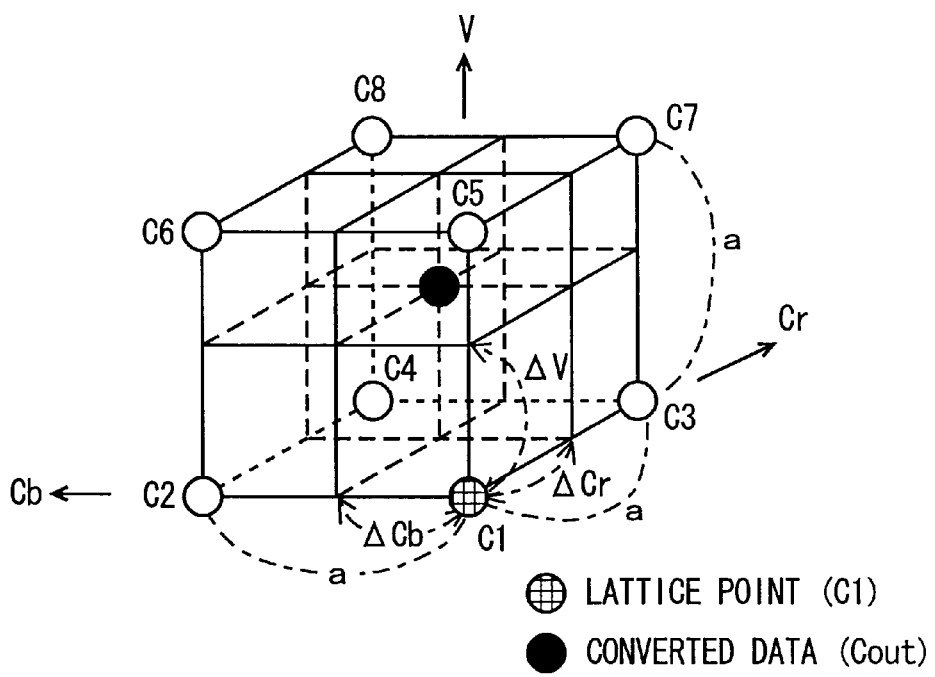

F I G. 6
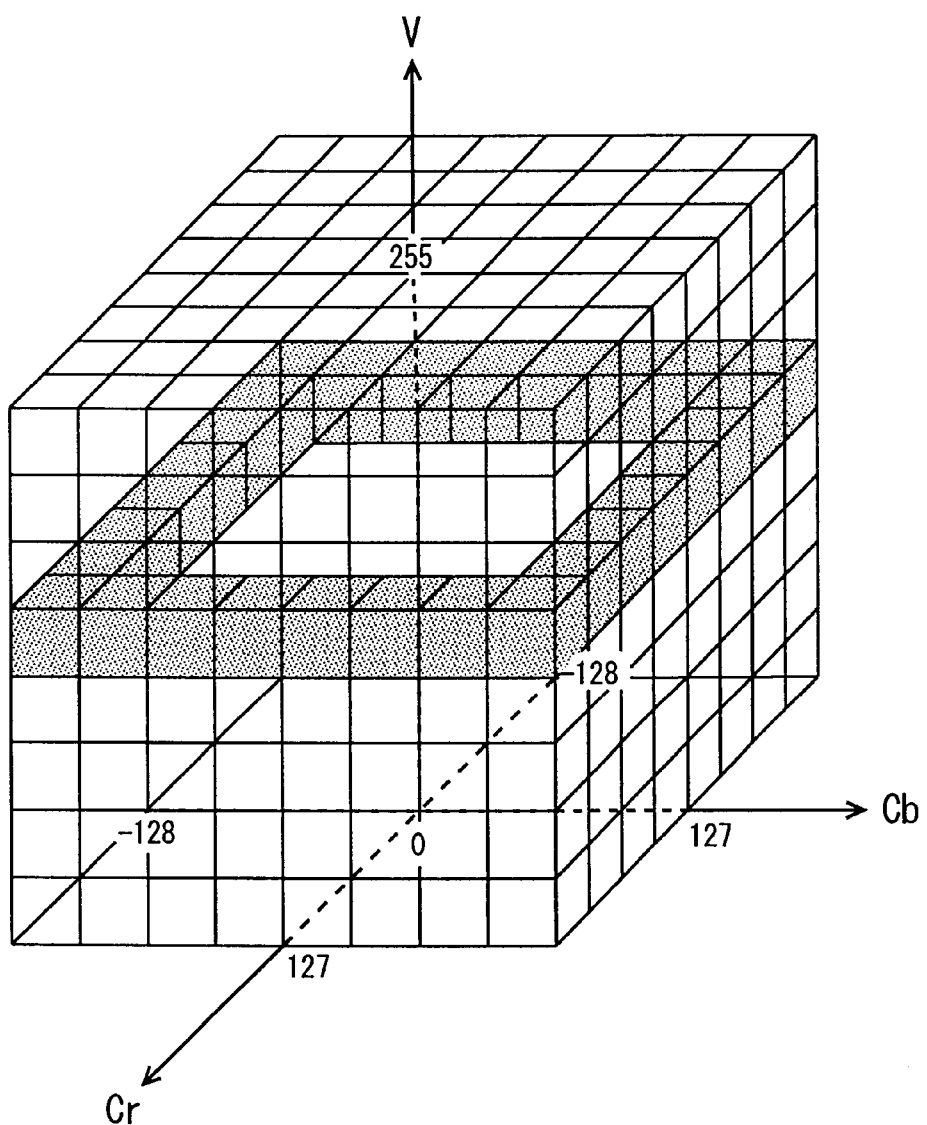

FIG. 9
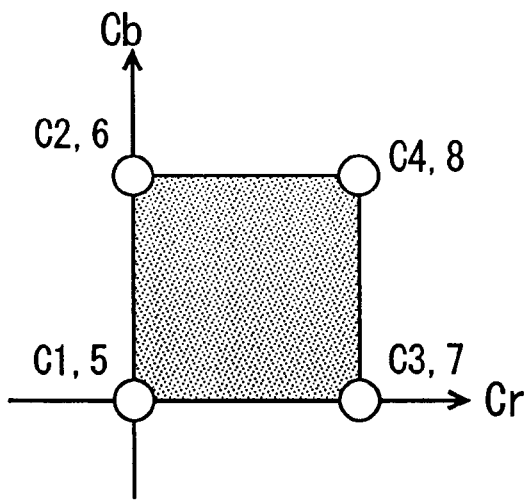
$$W0 \leq \sqrt{Cr^2 + Cb^2} \rightarrow \text{VIVID AREA}$$
WHEN V<V0
  C1, 2, 3, 4 = 0
WHEN V≧V0
  C5, 6, 7, 8 = 0
WHEN V<V0
  ΔV = a
WHEN V≧V0
  ΔV = 0

F I G. 11
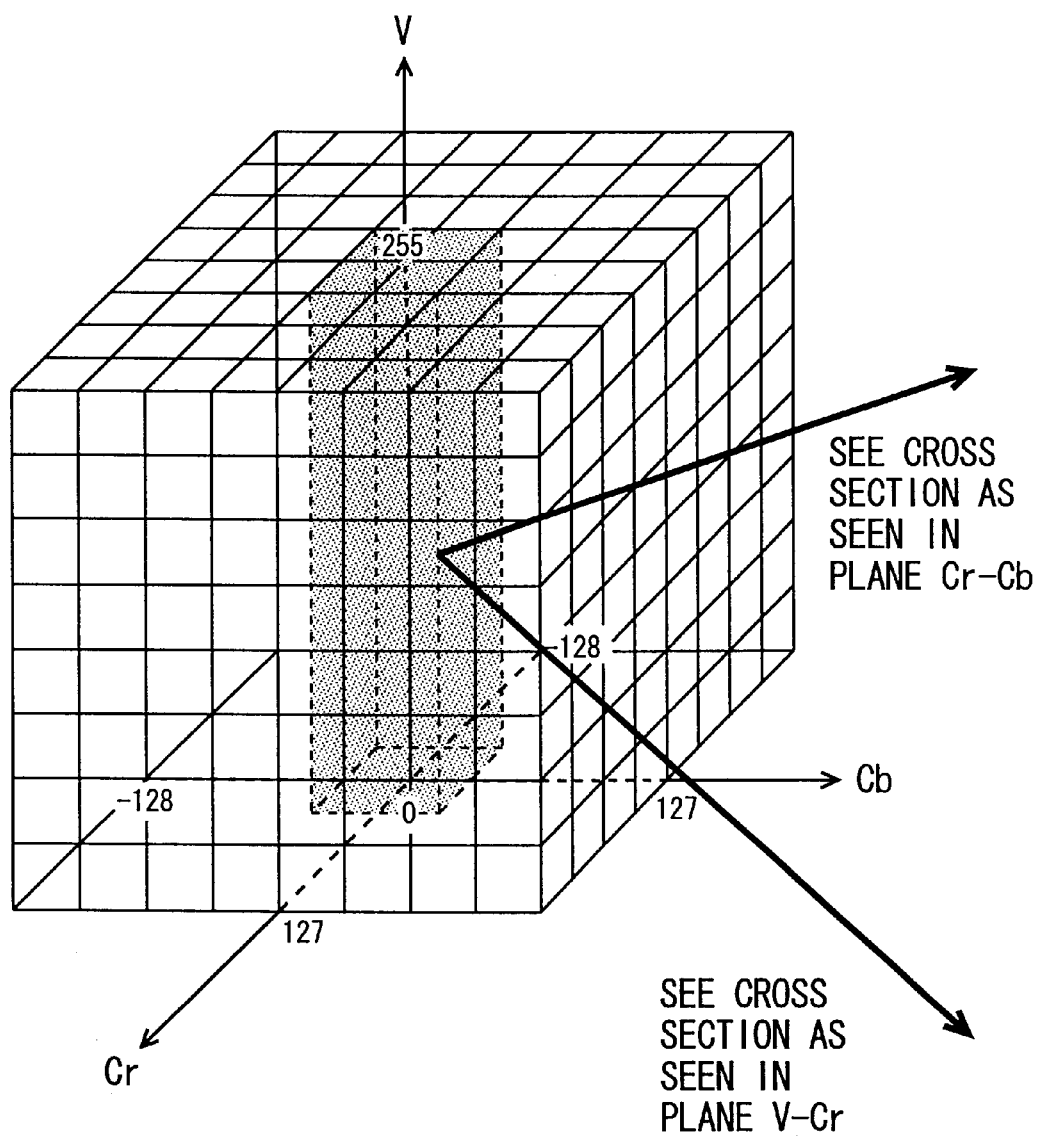

FIG. 14
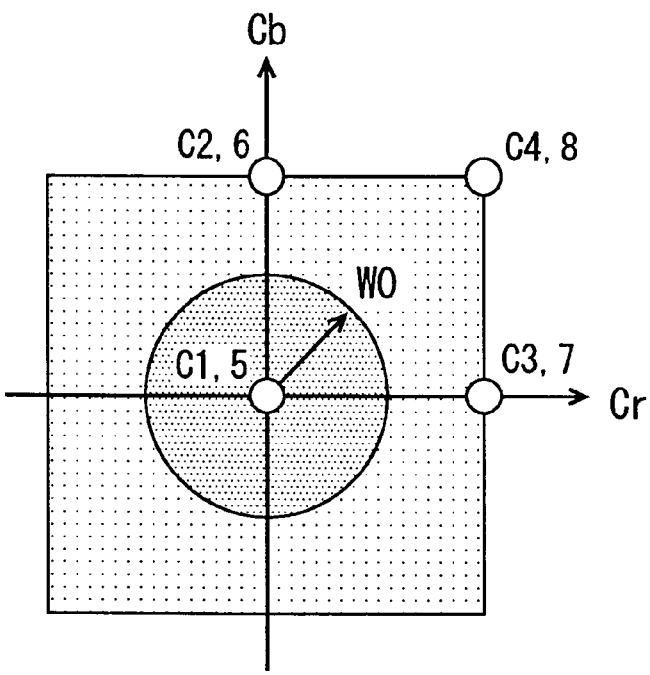
$$WO \geqq \sqrt{Cr^2 + Cb^2} \rightarrow \text{GRAY AREA}$$
REMOVE EFFECT OF
LATTICE POINT HAVING
HIGH SATURATION LEVEL
(W)
↓
C2, 6, 3, 7, 4, 8 = 0
$\Delta Cr, \Delta Cb = 0$ FIG. 15
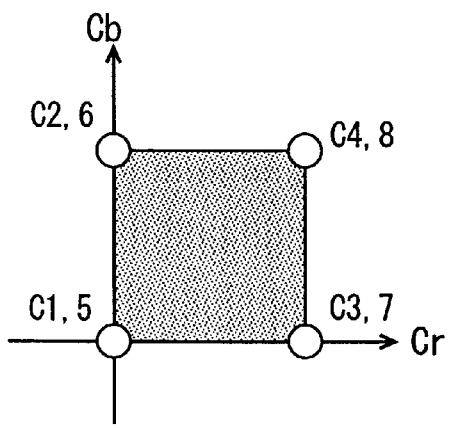
$$WO \leqq \sqrt{Cr^2 + Cb^2} \rightarrow \text{VIVID AREA}$$
- WHEN V<V0
  - C1 = C1-f(V)
  - C2 = C2-f(V)
  - C3 = C3-f(V)
  - C4 = C4-f(V)
- WHEN V≧V0
  - C5 = C5-f'(V)
  - C6 = C6-f'(V)
  - C7 = C7-f'(V)
  - C8 = C8-f'(V)
- WHEN V<V0
  - ΔV = ΔV × g(V)
- WHEN V≧V0
  - ΔV = ΔV × g'(V)

THE NUMBER OF CUBES :
$8 \times 8 \times 8 = 512$
THE NUMBER OF LATTICE POINTS :
$9 \times 9 \times 9 = 729$

COLOR CONVERSION DEVICE AND METHOD CAPABLE OF IMPROVING COLOR REPRODUCTION

This application is based on application Nos. 2000-144481 and 2001-128216 filed in Japan, the contents of which are hereby incorporated by reference.

BACKGROUND OF THE INVENTION

1. Field of the Invention

The present invention relates generally to color conversion devices and methods and particularly to those employing a three-dimensional look-up table in a direct mapping system to provide color conversion.

2. Description of the Related Art

Conventionally when input image data represented in a color space is converted to output image data represented in a different color space it is converted in a direct mapping system, a masking system or the like. Of these systems, the direct mapping system provides direct data conversion employing a three-dimensional look up table (LUT) correlating data of a color space for input image data and data of a color space for output image data with each other and thus storing these data therein.

However, storing in a three-dimensional LUT all of the output image data corresponding to input image data requires an enormous amount of memory capacity. Accordingly, together with a LUT an interpolation operation is normally performed to provide color conversion. More specifically, a minimal number of data (or lattice points) form a LUT and data between lattice points are calculated by an interpolation operation.

FIG. 21 is a schematic block diagram for illustrating a color conversion process employing such a direct mapping system as described above. Herein, input image data is data R, G, B, each having eight bits, represented in an RGB color space, and output image data is data C, M, Y, K, each having eight bits, represented in a CMY color space.

Note that output image data has each four components (C, M, Y, K) all converted in color similarly and a color conversion process for one of the four components, component C, will be described representatively.

With reference to FIG. 21, if a direct mapping system is used in a color conversion process, a three-dimensional LUT block 701 extracts eight lattice points and outputs data corresponding to the extracted lattice points and an 8-point interpolation block 703 calculates desired interpolation data between lattice points. Of the eight bits of each of data R, G, B in input image data, the three most significant bits are input to three-dimensional LUT block 701 and the five least significant bits are input to 8-point interpolation unit 703.

Three-dimensional LUT block 701 includes a three-dimensional LUT having recorded therein data of an RGB color space and that of a CMY color space correlated with each other. FIG. 22 is a diagram for illustrating a concept of the three-dimensional LUT. With reference to FIG. 22, the three-dimensional LUT has axes R, G, B each divided in eight to provide lattice points. Correlated to input image data corresponding to the lattice points, output image data (lattice point data) are stored in the three-dimensional LUT.

When three-dimensional LUT block 701 receives the most significant 3-bit data of each of data R, G and B, eight lattice points are extracted in the three-dimensional LUT. These eight lattice points form a minimal cube containing one lattice point of an RGB color space determined by the most significant 3-bit data of each of data R, G, B. Then the three-dimensional LUT is referred to to extract output data corresponding to each lattice point.

8-point interpolation block 703 calculates a weighting coefficient from the least significant 5-bit data of each of data R, G, B input thereto and it uses the calculated weighting coefficient and the output data or lattice point data corresponding to the eight lattice points extracted by three-dimensional LUT block 701, to obtain final output data Cout, as follows:

$$Cout = \sum_{i=1}^{8} Wi \cdot Ci$$

$$Wi = \frac{Vi}{a^3}$$

herein Wi represents a weighting coefficient calculated from the least significant 5-bit data of each of data R, G, B and Ci represents lattice point data. As shown in FIG. 23, weighting coefficient Wi represents the percentage with which each of eight lattice point data C1–C8 contributes to output data of one point determined by the least significant 5-bit data of each of data R, G, B, which is shown as a black point situated approximately in the middle of the cube.

In a three-dimensional LUT, lattice point data have slightly different colors and levels in lightness depending on their locations. As such for example if input image data exists in a significantly saturated or vivid area, using data of a lattice point with a saturation component of a low level to provide an interpolation process would impair the image in vividness.

If input image data exists in a vicinity of a gray axis (an axis V in a VCrCb space for example), using data of a lattice point with a saturation component of a high level to provide an interpolation process would impair gray balance.

SUMMARY OF THE INVENTION

The present invention has been made to overcome the disadvantages as described above and it contemplates a color conversion device capable of improving color reproduction.

To achieve the above object the present invention in one aspect provides a color conversion device including:

- a color conversion unit for receiving input of image data represented in a first color space to output a plurality of color converted data represented in a second color space;
- an interpolation block for using the color-converted data to perform an interpolation operation to obtain output image data represented in the second color space and corresponding to the image data input;
- a first determination block for determining a saturation level of the image data input; and
- a modification block for modifying a level of contribution of the plurality of color-converted data to the interpolation operation based on a determination result of the first determination block.

The present invention in another aspect provides a color conversion method including the steps of:

(1) obtaining, based on image data input represented in a first color space, a plurality of color-converted data corresponding to the image data input and represented in a second color space;

(2) determining a saturation level of the image data input;

(3) modifying, based on a result of step (2), a level of contribution of the plurality of color-converted data to an interpolation operation; and (4) using the color-converted data having a modified level of contribution, to perform the interpolation operation to obtain image data output represented in the second color space and corresponding to the image data input represented in the first color space.

The present invention in still another aspect to provide a program converting image data represented in a first color space to image data represented in a second color space, the program causing a computer to execute a process including the steps of:

(1) obtaining, based on image data input represented in a first color space, a plurality of color-converted data corresponding to the image data input and represented in a second color space;

(2) determining a saturation level of the image data input;

(3) modifying, based on a result of step (2), a level of contribution of the plurality of color-converted data to an interpolation operation; and (4) using the color-converted data having a modified level of contribution, to perform the interpolation operation to obtain image data output represented in the second color space and corresponding to the image data input represented in the first color space.

The present invention in still another aspect provides a color conversion device including:

a three-dimensional lookup table having color-converted data stored therein a form of data corresponding each lattice point of a three-dimensional lattice dividing a first color space, and represented in a second color space, the three-dimensional lookup table receiving input of image data represented in the first color space to output a plurality of color-converted data corresponding to each lattice point of a cube containing the image data input;

a first determination block for determining a saturation level of the image data input;

a selector for selecting a predetermined interpolation coefficient based on a determination result of the first determination block; and an interoperation block for using the interpolation coefficient selected by the selector and the plurality of color-converted data output from the three-dimensional lookup table, to perform an interpolation operation to obtain output image data represented in the second color space and corresponding to the image data input.

Thus the present invention can provide a color conversion device and method determining the saturation level of input image data which is in tern referred to to change an interpolation method to another to improve color reproduction.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the drawings:

FIG. 5 is a diagram for illustrating the concept of an interpolation operation in an 8-point interpolation block 223;

FIG. 6 is a diagram for illustrating a significantly saturated area;

FIG. 9 is a diagram for illustrating a function of the image processing apparatus of the first embodiment;

FIG. 11 is a diagram illustrating a gray area;

FIG. 14 illustrates a function of the image processing apparatus of the second embodiment;

FIG. 15 shows a variation of the first embodiment;

DESCRIPTION OF THE PREFERRED EMBODIMENTS

First Embodiment

An embodiment of the present invention will now be described with reference to the drawings.

Figure 1:
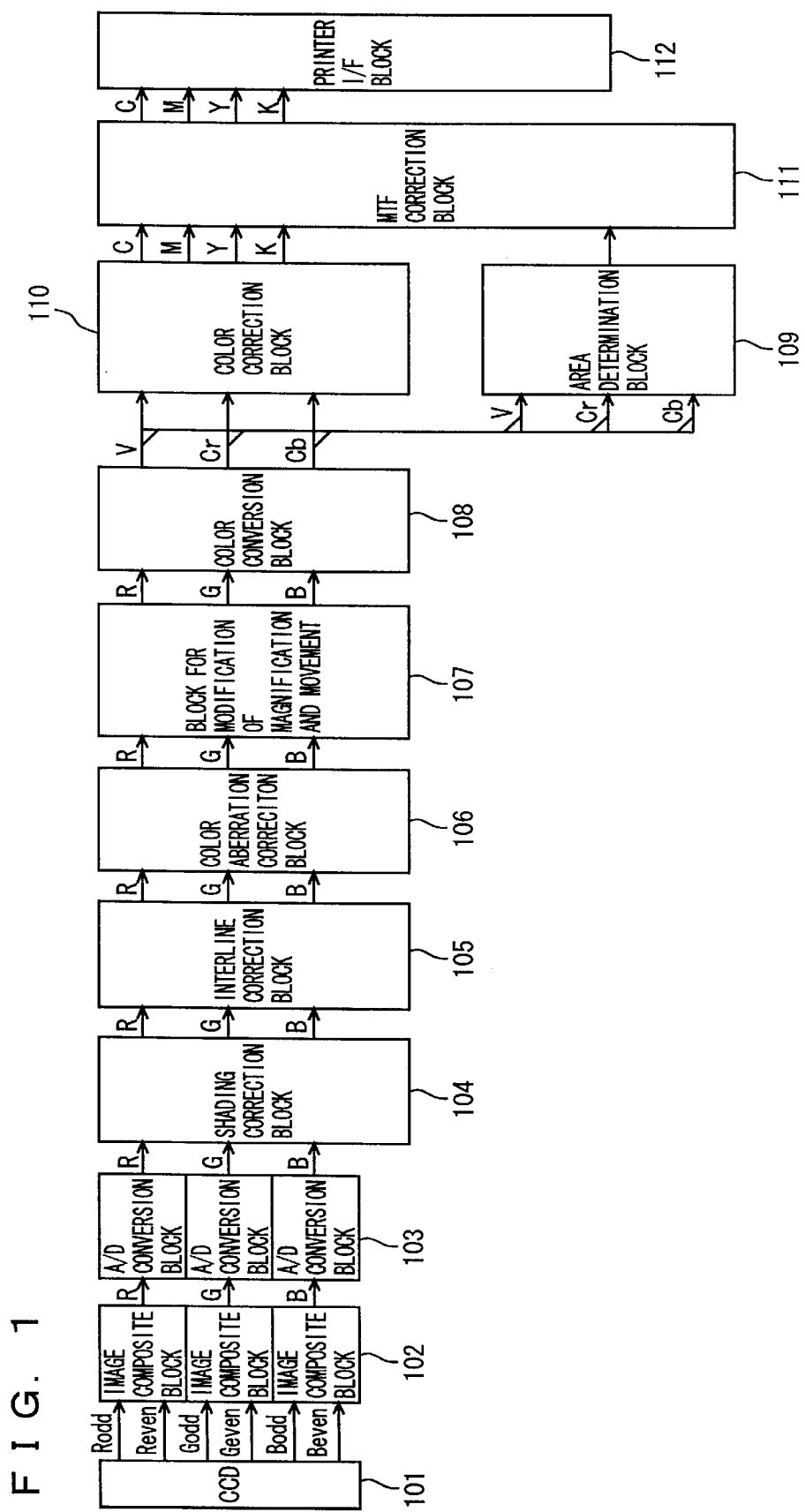
FIG. 1 showing a general configuration of an image processing apparatus in a first embodiment of the present invention.

FIG. 1 shows a general configuration of an image processing apparatus including a color conversion device in a first embodiment of the present invention. As shown in FIG. 1, the image processing apparatus includes a CCD 101 reading a target image in color, an image composite block 102 compositing even image data and odd image data that are read by CCD 101, an A/D conversion block 103 digitally converting analog image data R, G, B composited by image composite block 102, a shading correction block 104, various correction blocks including an interline correction block 105 and a color aberration correction block 106, a block 107 modifying a magnification of an image and moving the image, and a color conversion block 108.

Color conversion block 108 provides a color conversion process. In this process, input image data represented in an RGB color space is initially converted to image data represented in a VCrCb color space.

The image processing apparatus also includes an area determination block 109 determining areas of a photography, a letter and the like in an image, a color correction block 110 converting the image data in the VCrCb color space to output image data in a CMY color space (data CMYK) and correcting the data, an MTF correction block 111 subjecting the output image data obtained at color correction 110 to an MTF correction to consider a result obtained at area determination block 109, and a printer I/F block 112 outputting MTF-corrected data C, M, Y, K to a printer.

Data flows as follows:

Initially, RGB-colored image data read by CCD 101 is digitally converted and corrected as required and then converted by color conversion block 108 to data in a VCrCb color space temporarily. Then the data is converted in color correction block 110 by a direct mapping method to data represented in a CMY color space as required by a printer, i.e., data C, M, Y, K. Finally, data C, M, Y, K are MTF-corrected and thus transmitted to the printer.

Figure 2:
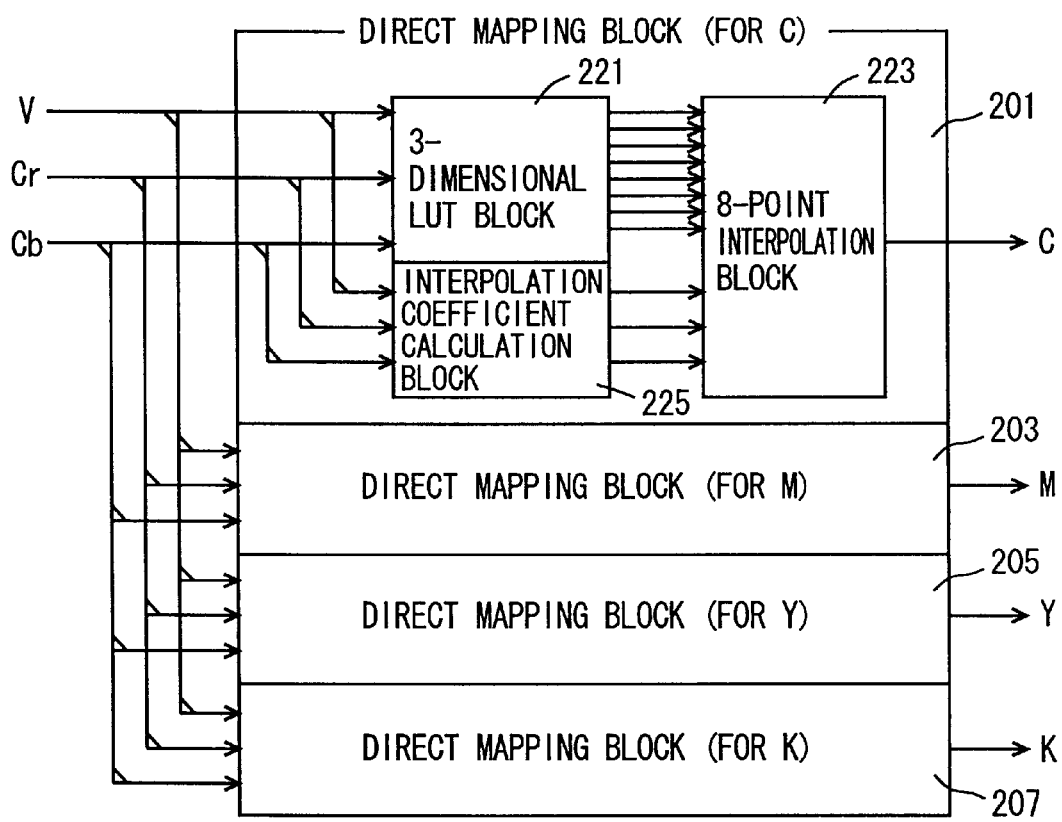
FIG. 2 is a functional block diagram showing a schematic configuration of the FIG. 1 color correction block 110.

FIG. 2 is a functional block diagram showing a schematic configuration of the FIG. 1 color correction block 110. As shown in the figure, color correction block 110 includes four direct mapping blocks 201, 203, 205 and 207 used to produce output data C, M, Y, K from input data V, Cr, Cb produced by color conversion block 108. The four direct mapping blocks are identical in configuration and accordingly that for component C is shown representatively.

Direct mapping block 201 includes a three-dimensional LUT block 221 extracting eight lattice points and outputting data corresponding to the extracted lattice points, an interpolation coefficient calculation block 225 calculating an interpolation coefficient, and an 8-point interpolation block 223 using the eight lattice point data and the interpolation coefficient to perform an operation to provide an interpolation between lattice points.

Figure 3:
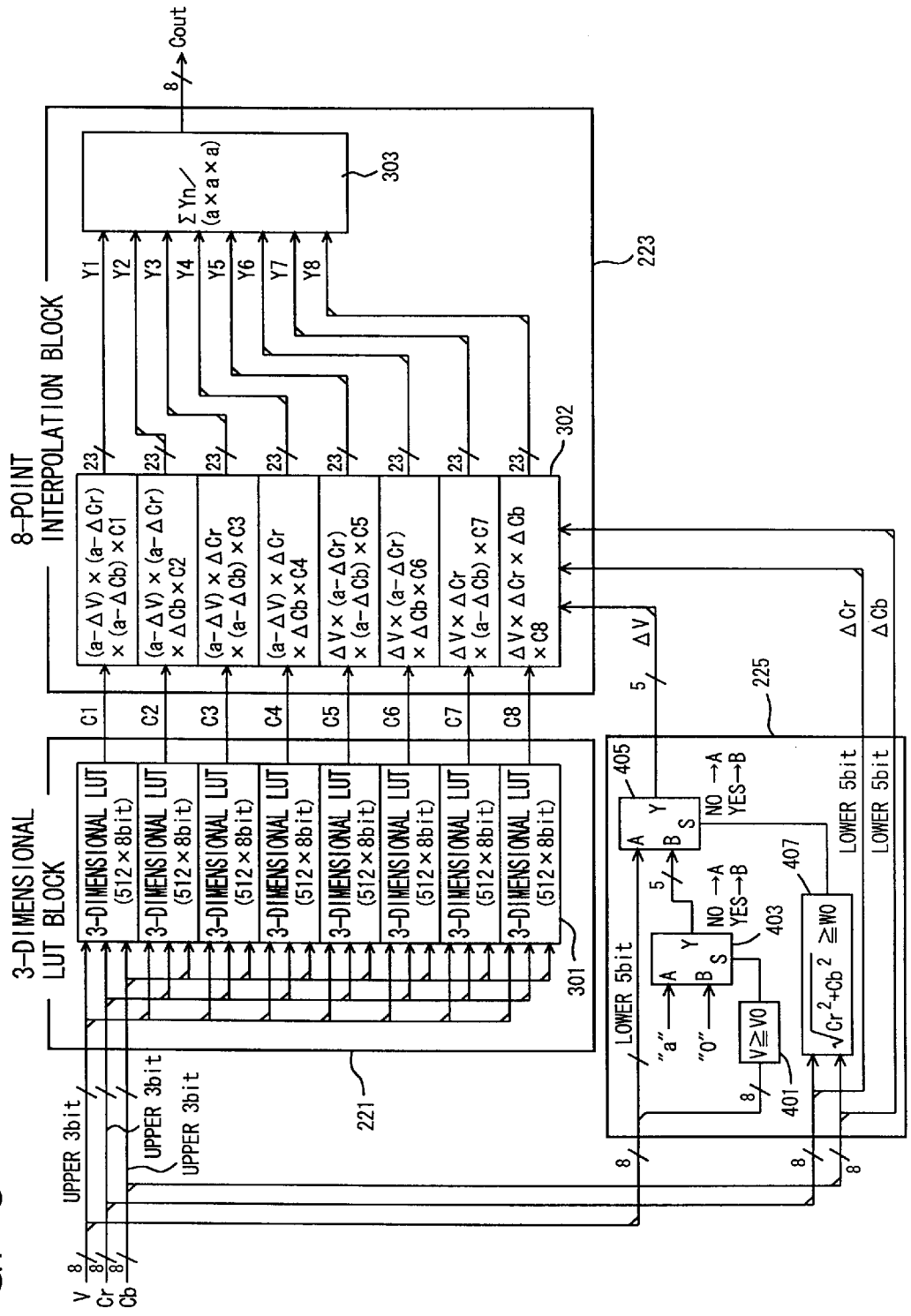
FIG. 3 more specifically shows a configuration of the FIG. 2 direct mapping block 201.

FIG. 3 shows in detail a configuration of the FIG. 2 direct mapping block 201. As shown in the figure, three-dimensional LUT 221 includes eight three-dimensional LUTs 301 having recorded therein data of the VCrCb color space and data of component C of the CMY color space, correlated with each other.

Figure 4:
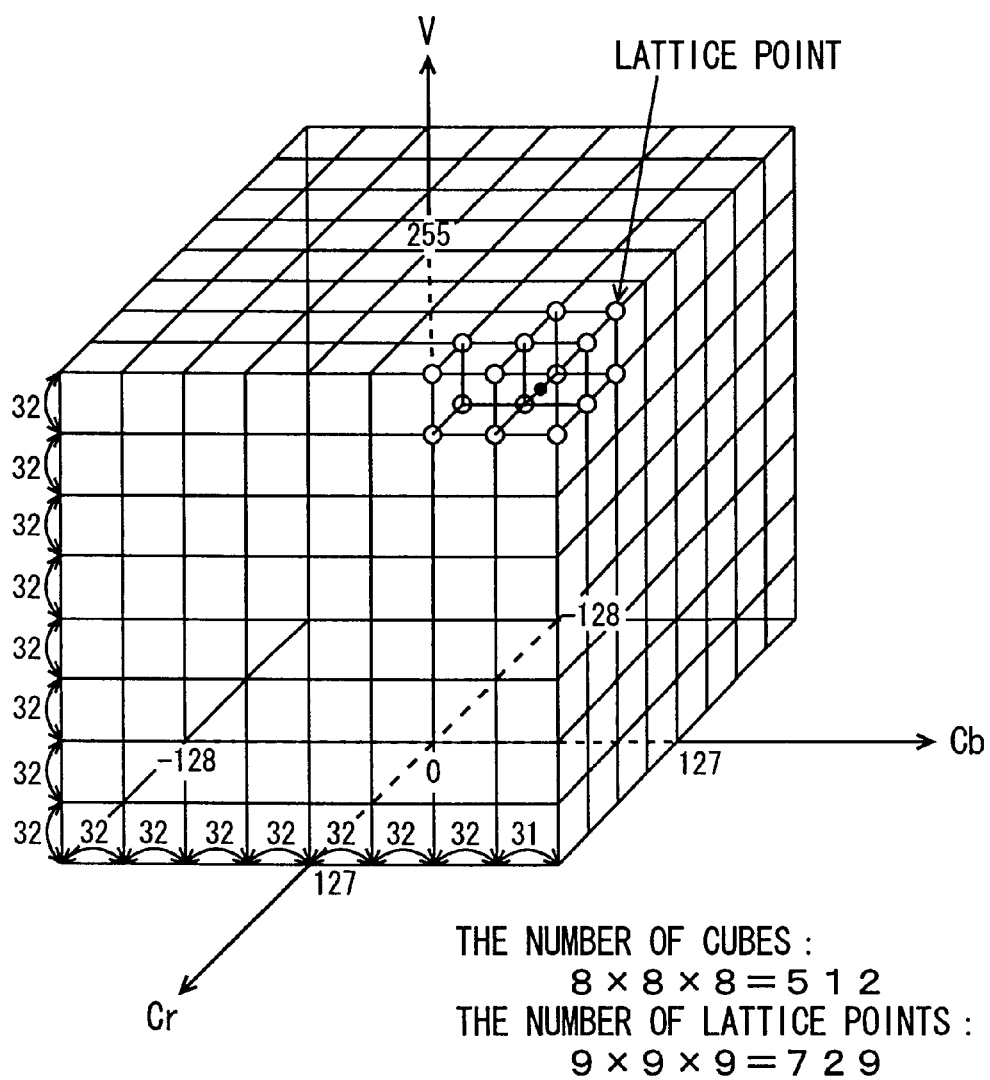
FIG. 4 is a diagram for illustrating the concept of a three-dimensional LUT block 221.

FIG. 4 is a diagram for illustrating the concept of three-dimensional LUT block 221. As shown in the figure, the VCrCb color space corresponding to an input color space has each axis divided in eight and it is thus divided into 512 cubes in total. Of input image data configured of 8-bit data V (0–255), Cr (–128–127) and Cb (–128–127), the most significant three bits of each data are input and thus used to select one cube to be targeted.

For each cube eight lattice points are defined and for each lattice point three-dimensional LUT 301 corresponding thereto is referred to, and from three-dimensional LUT 301 is output lattice point data C1–C8 stored corresponding to the most significant 3-bit data of each data.

Interpolation coefficient calculation block 225 includes a comparator 401 comparing data V with a threshold V0, a selector 403 receiving and referring to an output of comparator 401 to output "a" or "0", a determination block 407 determining from data Cr and Cb whether a relationship $\sqrt{(Cr^2+Cb^2)} \geq W0$ is established, and a selector 405 receiving and referring to an output of determination block 407 to select the least significant five bits of data V or the output of selector 403 for outputting as an interpolation coefficient $\Delta V$.

Selector 403 for $V \geq V0$ outputs "0" and for $V < V0$ outputs "a".

Determination block 407 determines whether input data exists in a vivid area or an area having a saturation level no less than a predetermined value. If $\sqrt{(Cr^2+Cb^2)} \geq W0$ or input data exists in a vivid area selector 405 outputs the output of selector 403. If $\sqrt{(Cr^2+Cb^2)} < W0$ or input data does not exist in a vivid area selector 405 outputs the least significant five bits of data V.

Interpolation coefficient calculation block 225 outputs the least significant five bits of each of data Cr and Cb as interpolation coefficients $\Delta Cr$ and $\Delta Cb$, respectively.

8-point interpolation block 223 includes a calculation block 302 calculating a product of eight lattice point data C1–C8 and a coefficient corresponding thereto, and an averaging block 303 calculating an weighted average based on data Y1–Y8 output from calculation block 302.

Calculation block 302 receives data C1–C8 output from three-dimensional LUT block 221 and corresponding to eight lattice points, and interpolation coefficients $\Delta C$, $\Delta Cr$, $\Delta Cb$ output from interpolation coefficient calculation block 225. Calculation block 302 calculates the product of each lattice point data and a coefficient represented by an interpolation coefficient and corresponding to the lattice point data, i.e., Y1–Y8.

Calculation block 302 outputs data Y1–Y8 to averaging block 303 which in turn calculates a summation of the data and finally provides a weighted average for eight lattice point data C1–C8 as final output data Cout.

FIG. 5 is a diagram for illustrating the concept of the interpolation operation performed in 8-point interpolation block 223. With reference to the figure, eight lattice points or lattice point data form a cube having therein a black point, which represents converted data (Cout) to be output.

Converted data Cout is obtained by providing a weighted average for eight lattice point data C1–C8 using a ratio in volume of eight cubes obtained by dividing the cube containing the black point by three planes parallel to surface planes of the cube.

As such, if the cube has a side a, wherein a=32, then converted data Cout can be represented as follows:

$$\begin{aligned} Cout = [&\{(a-\Delta V) \times (a-\Delta Cr) \times (a-\Delta Cb) \times C1\} + \\ &\{(a-\Delta V) \times (a-\Delta Cr) \times \Delta Cb \times C2\} + \\ &\{(a-\Delta V) \times \Delta Cr \times (a-\Delta Cb) \times C3\} \{(a-\Delta V) \times \Delta Cr \times \Delta Cb) \times C4\} + \\ &\{\Delta V \times (a-\Delta Cr) \times (a-\Delta Cb) \times C5\} + \{\Delta V \times (a-\Delta Cr) \times \Delta Cb \times C6\} + \\ &\{\Delta V \times \Delta Cr \times (a-\Delta Cb) \times C7\} + \{\Delta V + \Delta Cr \times \Delta Cb \times C8\}]/(a \times a \times a) \end{aligned}$$

FIGS. 6–9 are diagrams for illustrating an effect of the present embodiment.

As shown in FIG. 6, a VCrCb color space has a significantly saturated or vivid area shown hatched. As shown in the figure, the significantly saturated area has values Cr and Cb distant from 0 and a value V having a position intermediate between 0 and 255.

If input data exists in such a significantly saturated area, involving lattice point data external to the significantly saturated area in providing a weighted average would impair output data in vividness. Accordingly in the present embodiment if input image data exists in a significantly saturated area, lattice point data external to the significantly saturated area is not used in providing a weighted average.

Figure 7:
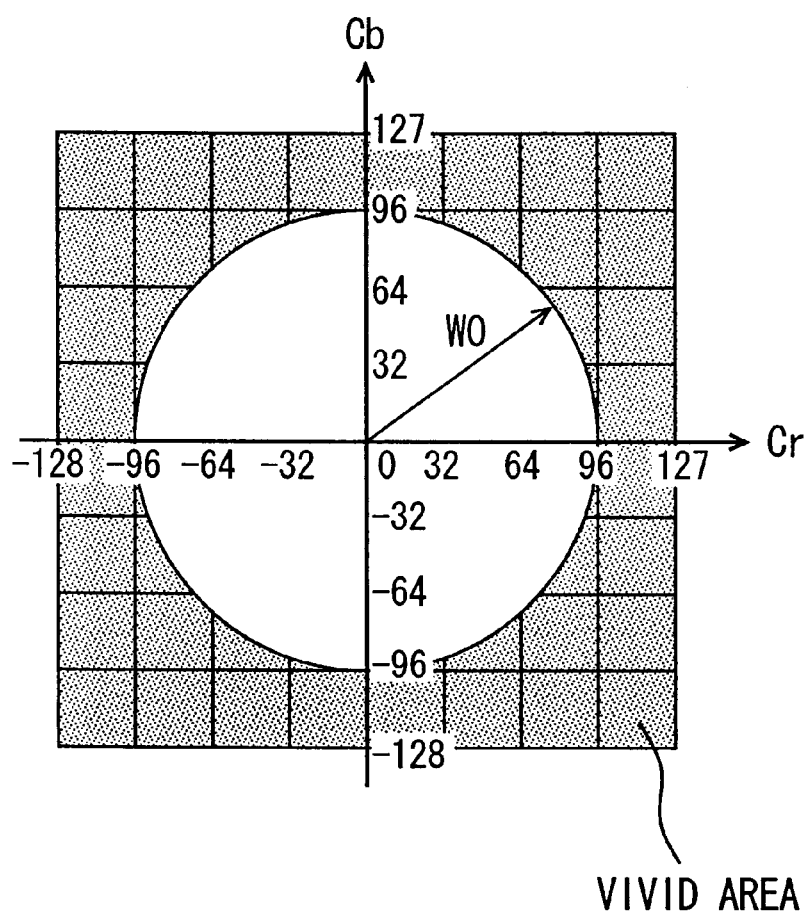
FIG. 7 is a diagram for illustrating a determination process in a determination block 407.

More specifically, as shown in FIG. 7, in a VCrCb color space as seen in the Cr-Cb cross section an area having $\sqrt{(Cr^2+Cb^2)}$ no less than W0 serves as a vivid area.

Figure 8:
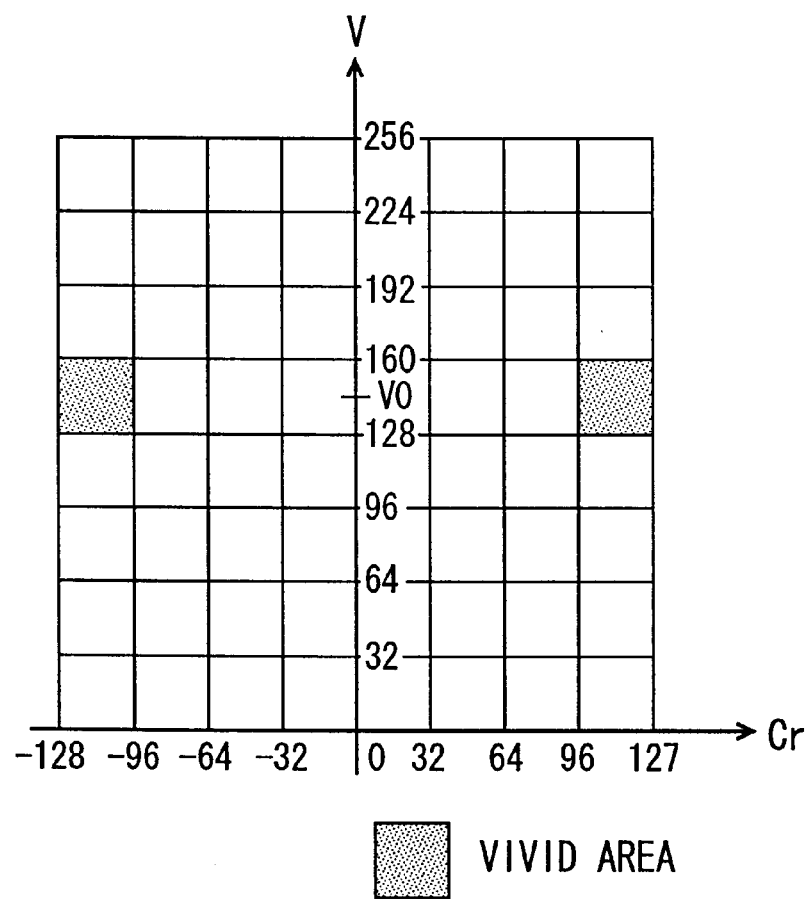
FIG. 8 is a diagram for illustrating a distribution of a vivid area.

Note that as in the FIG. 8 V-Cr cross section a vivid area only exists at a location having value V intermediate between maximal and minimal values or therearound. Value V allowing the vivid area to exist has a range with a median V0 equal to 128.

FIG. 9 is a diagram for illustrating a function of the image processing apparatus of the present embodiment.

If input data exists in a vivid area, lattice point data external to the significantly saturated area is not used, as follows: More specifically, if V<V0, ΔV is set to be equal to a to null effects of lattice points C1–C4 shown in FIG. 5. If V≧V0 then ΔV is set to be equal to 0 to null effects of lattice points C5–C8. Thus only lattice point data in the significantly saturated area can be used to provide an interpolation process to enhance an output image in vividness.

If input data does not exist in a vivid area, the least significant five bits of data V are used as ΔV.

While in the present embodiment the relationship between V and V0 is referred to to determine lattice point data to be used, if input data exists in a vivid area ΔV=a may be used to constantly remove effects of lattice point data, C1–C4, having a low level in lightness. More specifically, if input data exists in a vivid area, only lattice point data having a high level in lightness, C5–C8, may be used in performing an interpolation operation.

Second Embodiment

Figure 10:
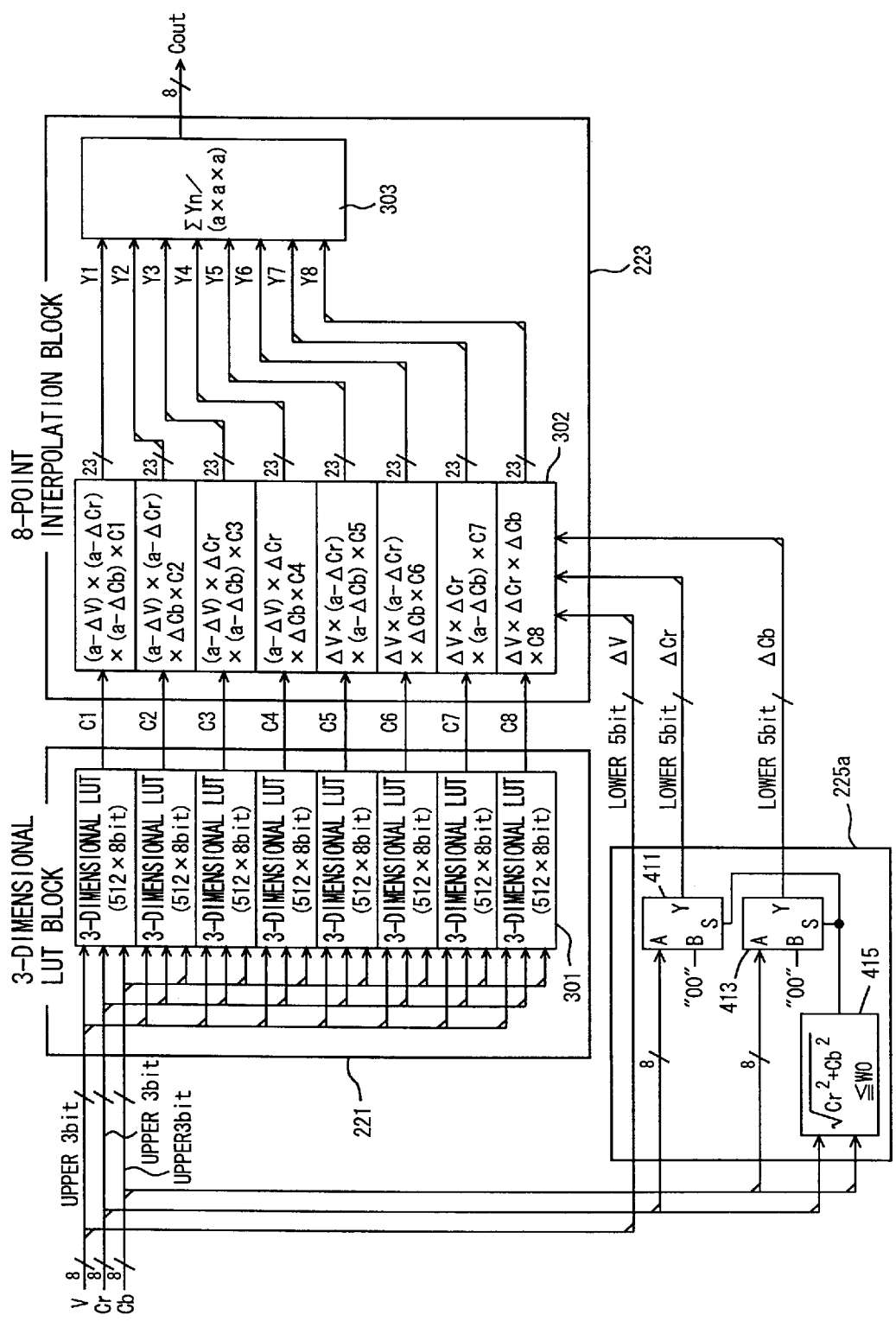
FIG. 10 shows in detail a configuration of a direct mapping block in a second embodiment of the present invention.

FIG. 10 shows a specific configuration of direct mapping block 201 in a second embodiment of the present invention. In the present embodiment direct mapping block 201, as compared with the FIG. 3 direct mapping block, is characterized in that an interpolation coefficient calculation block 225a adjusts a gray component.

More specifically, if input data has a saturation level no more than a predetermined value a weighting coefficient varies and only lattice point data with a low saturation level is used in a weighting operation.

In the present embodiment interpolation coefficient calculation block 225a includes a determination block 415 determining whether $\sqrt{(Cr^2+Cb^2)}$ has a value no more than W0, a selector 411 referring to a determination of determination block 415 to output the least significant five bits of data Cr or "00", and a selector 413 referring to a determination of determination block 415 to output the least significant five bits of data Cb or "00".

Selector 411 and 413 output "00" for $\sqrt{(Cr^2+Cb^2)}<W0$ and the least significant five bits of each of data Cr and Cb, respectively, for $\sqrt{(Cr^2+Cb^2)}>W0$.

FIGS. 11–14 are diagrams for illustrating a function of the direct mapping block of the present embodiment.

With reference to FIG. 11, the hatched area represents an area with input data having a low saturation level, i.e., a gray area. If input data exists in a gray area, using lattice point data having a high saturation level impairs gray balance.

As such in the present embodiment if input data exists in a gray area, setting ΔCr and ΔCb to be zero can prevent lattice point data with a high saturation level from being used in an interpolation process and allows only lattice point data on axis V (the gray axis) to be used in the interpolation process.

Figure 12:
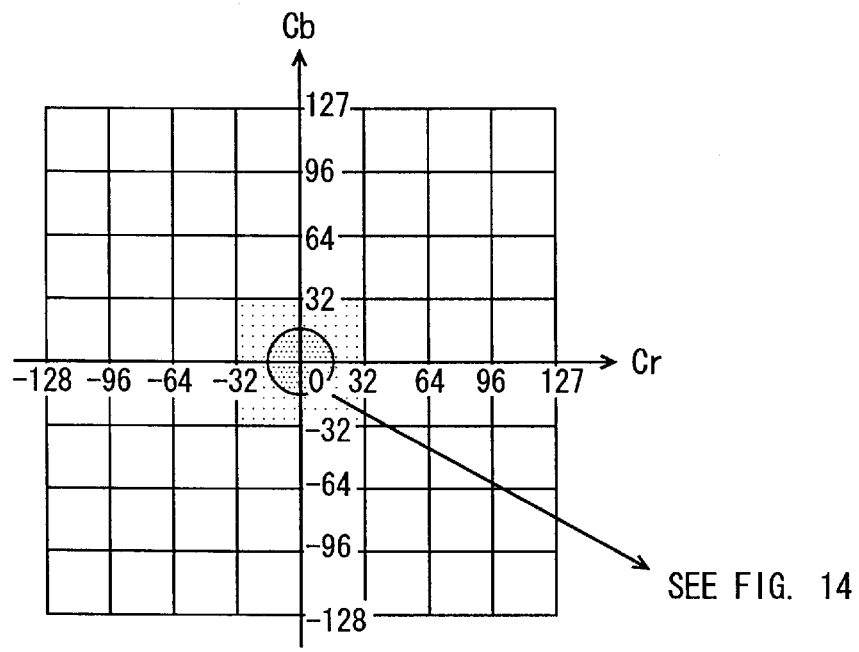
FIG. 12 represents a gray area in a plane Cr-Cb.
Figure 13:
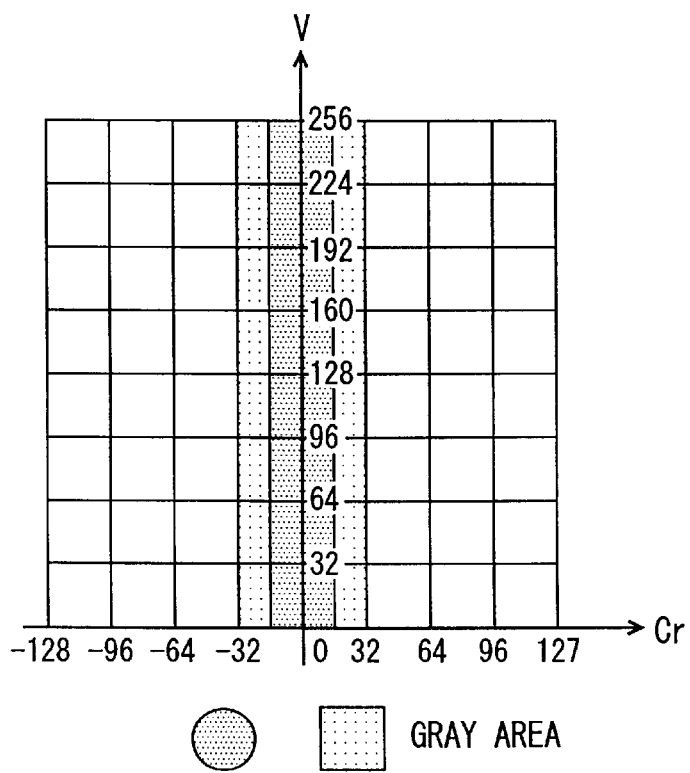
FIG. 13 represents a gray area in a plane V-Cr.

More specifically, in the FIG. 12 Cr-Cb plan view and the FIG. 13 V-Cr plan view a gray area, shown hatched, is determined and to change an interpolation process procedure to another the FIG. 14 process is executed.

With reference to FIG. 14, if $W0 \geq \sqrt{(Cr^2+Cb^2)}$ a determination is made that input data exists in a gray area and lattice point data with a high saturation level has its effect nulled by setting ΔCr and ΔCb to have a value of 0.

Such a process as above can provide in the present embodiment an output image having an improved gray balance.

Note that the process in the first embodiment and that in the second embodiment may be provided in a single image processing apparatus simultaneously.

First Variation

In the first embodiment if input data exists in a vivid area, lattice points C1–C4 and C5–C8 have their effects nulled for V<V0 and V≧V0, respectively, to provide an interpolation without involving lattice point data existing external to the significantly saturated area. Alternatively, these lattice points may have their contribution to an interpolation operation reduced in level to enhance an output image in vividness.

More specifically, the FIG. 9 process may be replaced with the FIG. 15 process.

More specifically, with reference to FIG. 15, if $W0 \leq \sqrt{(Cr^2+Cb^2)}$ then a determination is made that image data exists in a vivid area and for lightness V<V0 lattice points C1–C4 have their contribution reduced in level by subtracting from their respective values a value represented by f(V) and for lightness V≧V0 lattice points C5–C8 have their effects reduced by subtracting from their respective lattice point values a value represented by f'(V).

Figure 16:
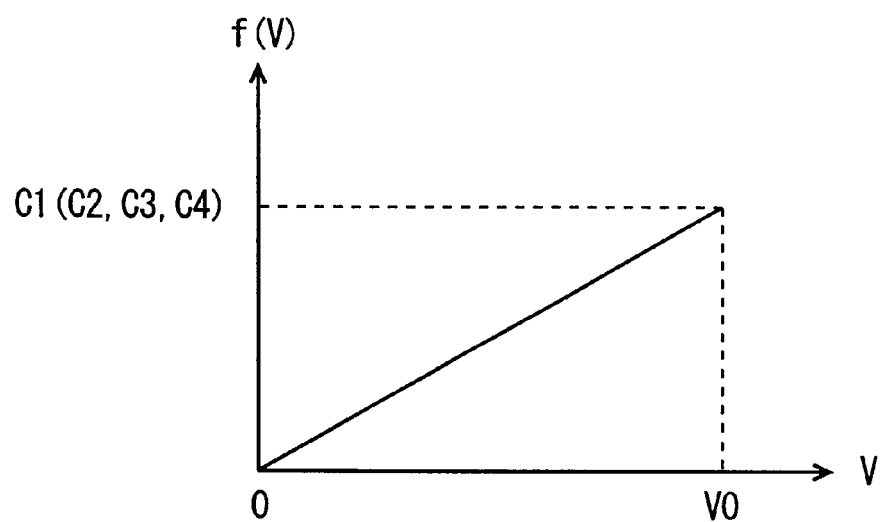
FIG. 16 represents a level of contribution of a lattice point when V<V0.

FIG. 16 is a graph representing value f(V). As represented in the figure, value f(V) for V having a value of 0 has a value of 0 and for V having a value of V0 has a value of lattice points C1–C4.

Thus, as represented by the FIG. 15 expression, if V=0 C1–C4 do not have their values subtracted and as V approaches V0 C1–C4 have their respective values approaching 0.

Figure 17:
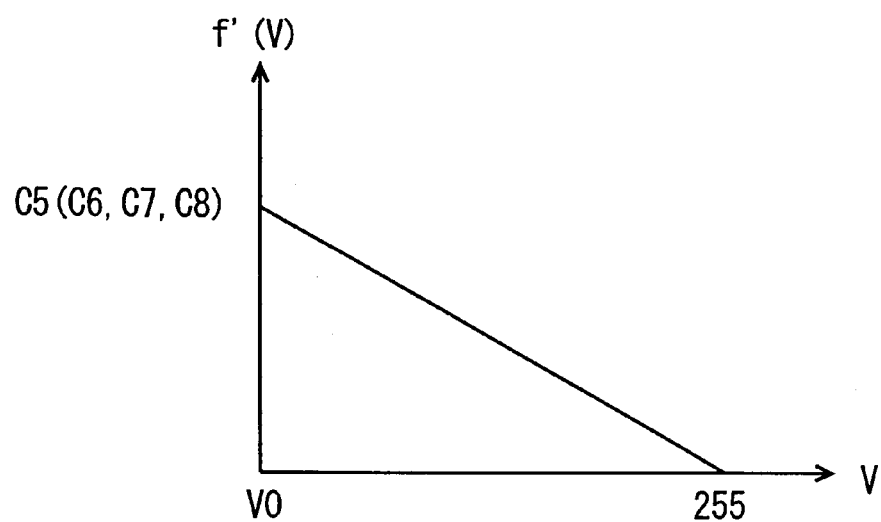
FIG. 17 represents a level of contribution of a lattice point when V≧V0.

FIG. 17 is a graph representing value f' (V). As represented in the figure, f' (V) for V=V0 has a value of lattice points C5–C8 and as V approaches 255 f' (V) approaches 0 and when V attains 255 f' (V) attains 0. Thus, as represented by the FIG. 15 expression, if V=V0 lattice points C5–C8 have a value of 0 and if V=255 lattice points C5–C8 do not have a value subtracted.

Such a process as above ultimately corrects value ΔV, as follows: More specifically, with reference to FIG. 15, if V<V0 then value ΔV is multiplied by a value of a function g(V). Function g(V) is a function reducing a contribution level of a lattice point having a lower level in lightness, i.e., C1–C4. If V≧V0 then value ΔV is multiplied by a value of a function g'(V). Function g'(V) is a function reducing a contribution level of a lattice point having a higher level in lightness, i.e., C5–C8.

Figure 18:
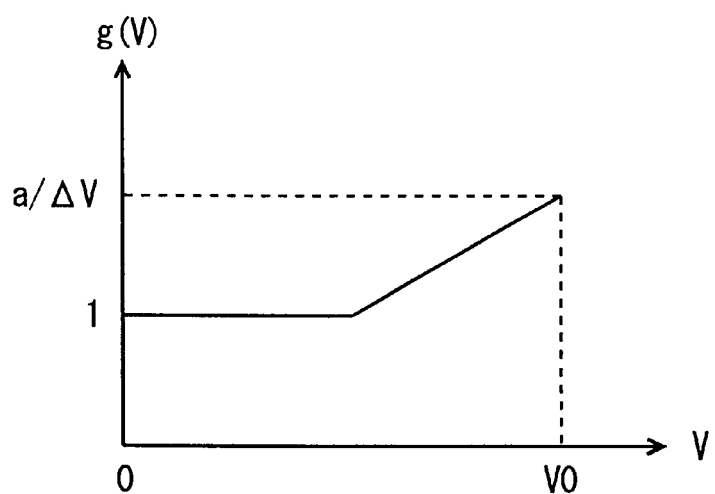
FIG. 18 represents an output of ΔV when V<V0.
Figure 19:
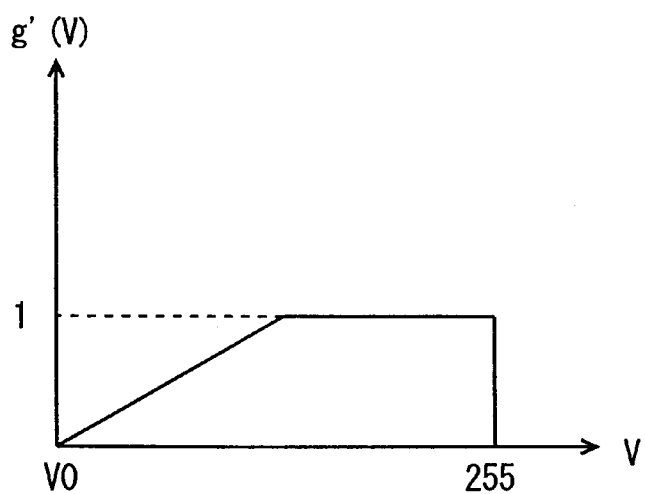
FIG. 19 represents an output of ΔV when V >V0.

FIGS. 18 and 19 are graphs representing functions g(v) and g'(v), respectively.

With reference to FIG. 18, in an area having a low level in lightness V (an area smaller in V and also lower in the level of saturation) g(V) has a value of one. In this area, value ΔV is not corrected. By contrast, if lightness V is increased to some extent, value g(V) increases toward a/Δv. Thus in the area a correction can be made to increase value ΔV to allow a lattice point having a lower level in lightness to have a reduced effect.

Furthermore, with reference to FIG. 19, value g'(V) has a value of one for an area having a high level in lightness V and increases from 0 to 1 for an area having lightness V of at least V0 and low in level to some extent. Thus for the area of interest ΔV is multiplied by a number no more than one and a correction is thus made to reduce ΔV. Thus in the area of interest consequently a correction is made to allow a lattice point having a high level in lightness to have a small contribution.

In the first embodiment if input data exists in a vivid area the input data has its lightness referred to to null the effect of a lattice point data having a high level in lightness or that of a lattice point data having a low level in lightness, i.e., set ΔV=0 or ΔV=a. Alternatively, as has been described in the present variation, as input data's saturation level approaches a high area or V approaches V0, C1–C4 for V<V0 or C5–C8 for V≧V0 may have a value approaching 0, i.e., their contribution to an interpolation operation may be reduced in level.

In the second embodiment, if input data has a saturation level no more than a predetermined value, lattice point data having a high saturation level is not used in providing an interpolation process, i.e., its contribution level is nulled. Alternatively, if input data has a saturation level no more than the predetermined value, lattice point data having a high saturation level may have its contribution to an interpolation operation reduced in level.

Second Variation

In each embodiment and variation described above, 8-point interpolation block 223 uses lattice point data selected as appropriate with input data's saturation level taken in the account via a hard logic circuit configured of comparator 401, selectors 403, 405, 411 and 413, determination blocks 407 and 415, and the like. Alternatively, this process implemented by the hard logic circuitry may be provided in the form of a software program executed by a computer. In this example, the present invention can be understood as a software program causing a computer to execute the process.

Figure 20:
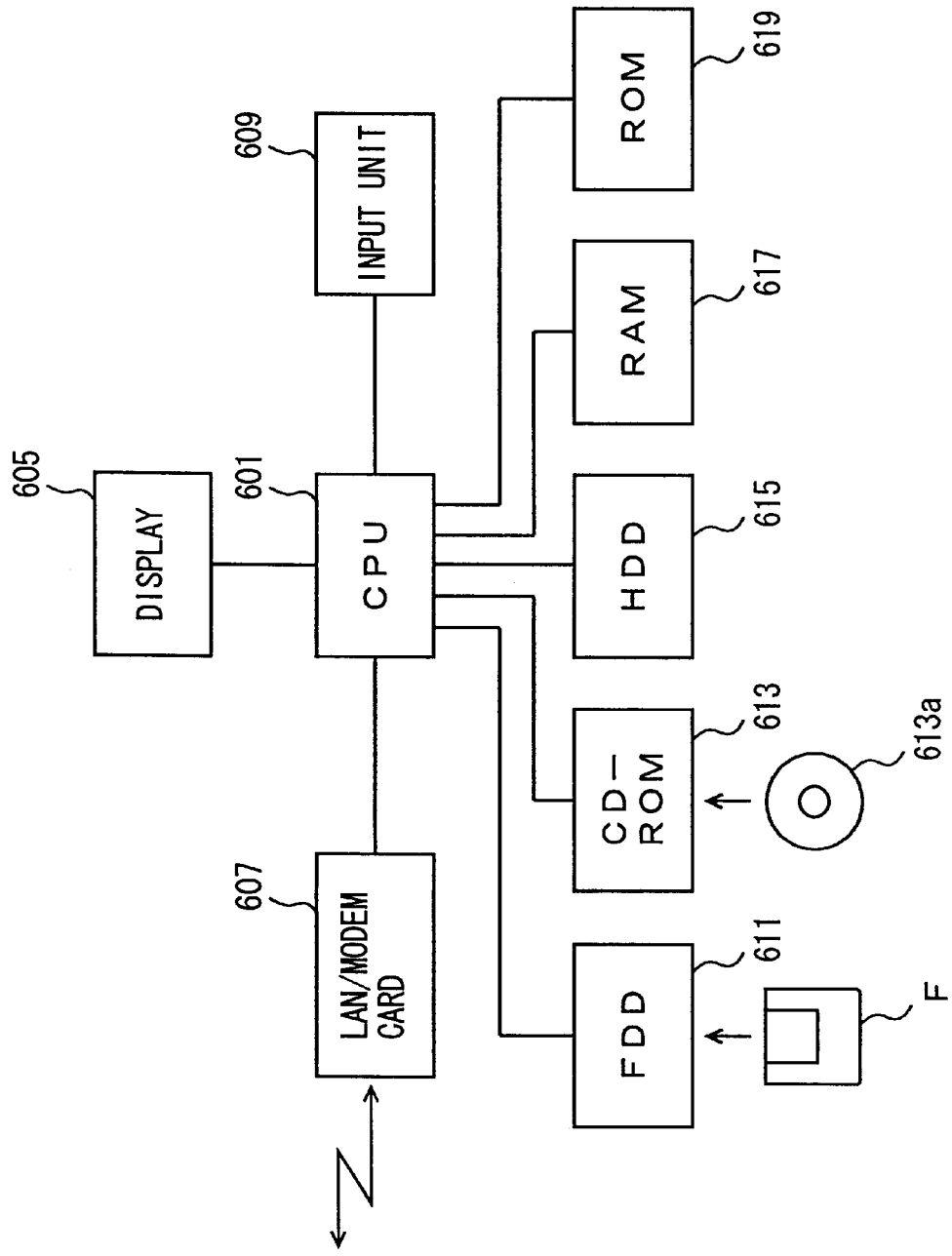
FIG. 20 is a block diagram showing a configuration of a computer executing a program of the present invention.
Figure 21:
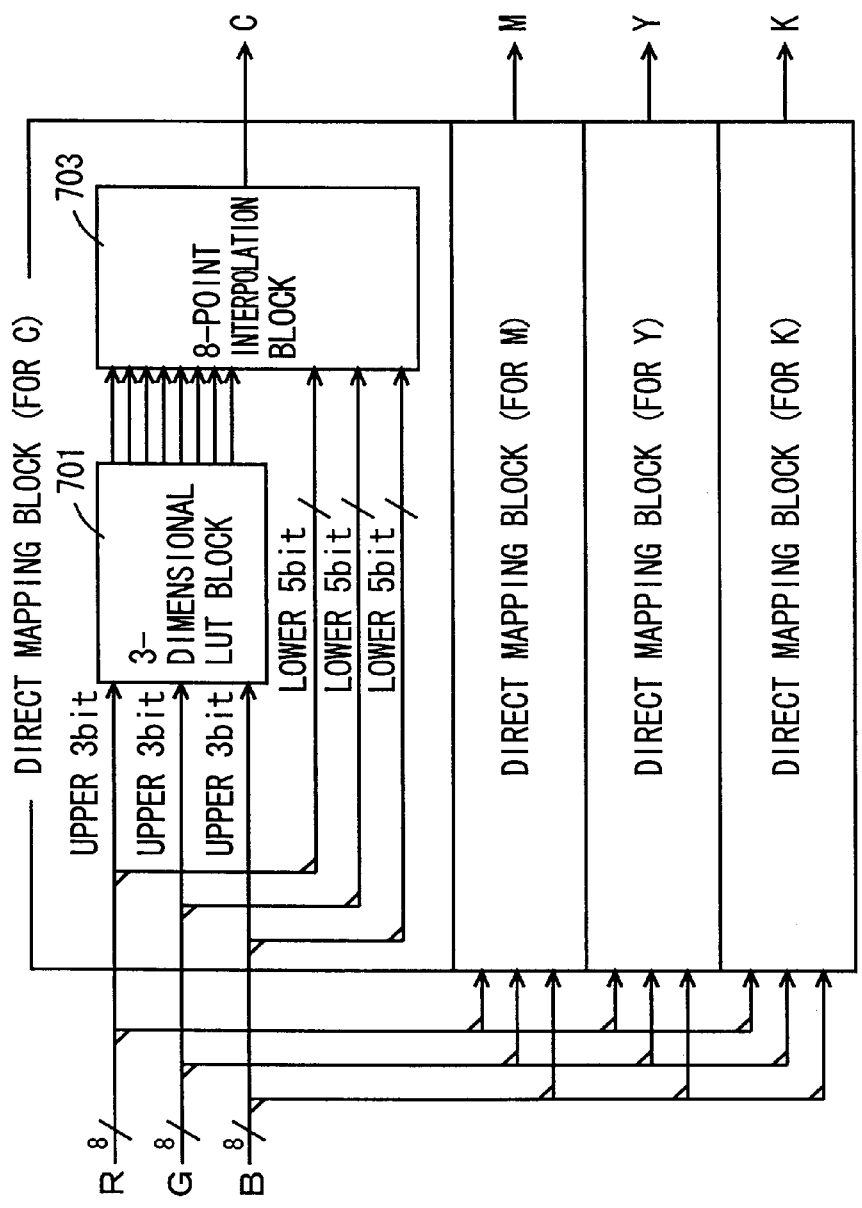
FIG. 21 is a schematic block diagram for illustrating a color conversion process in a direct mapping system of conventional art.
Figure 22:
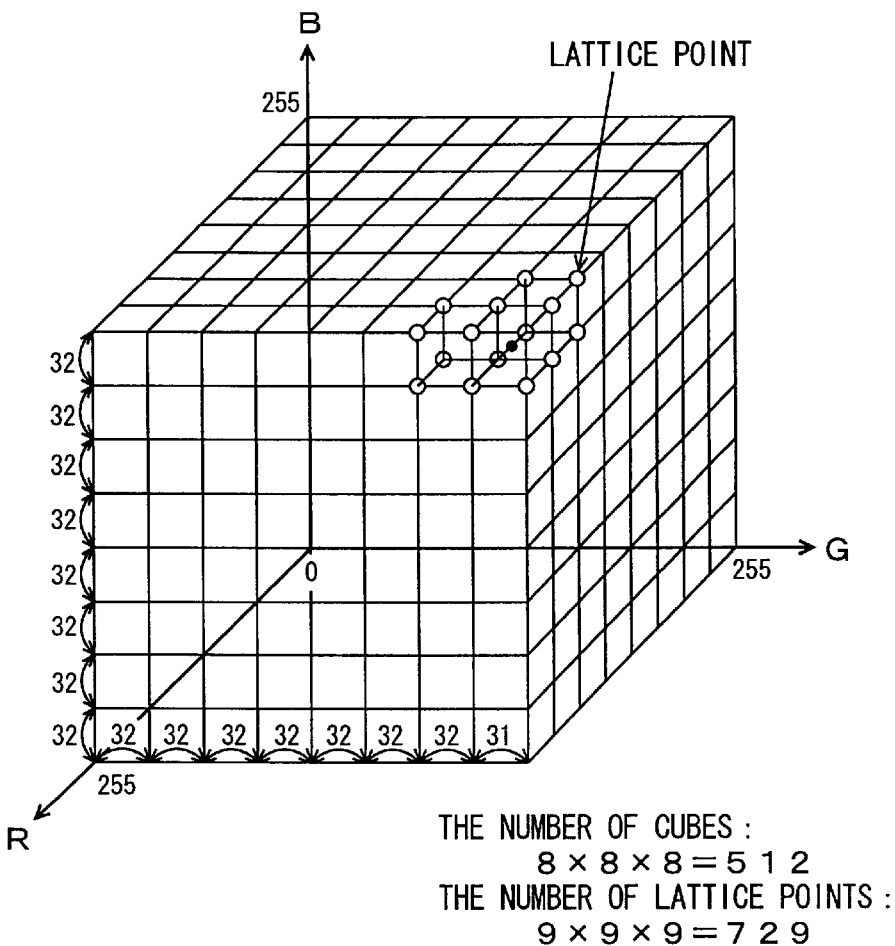
FIG. 22 is a diagram for illustrating the concept of a three-dimensional LUT.
Figure 23:
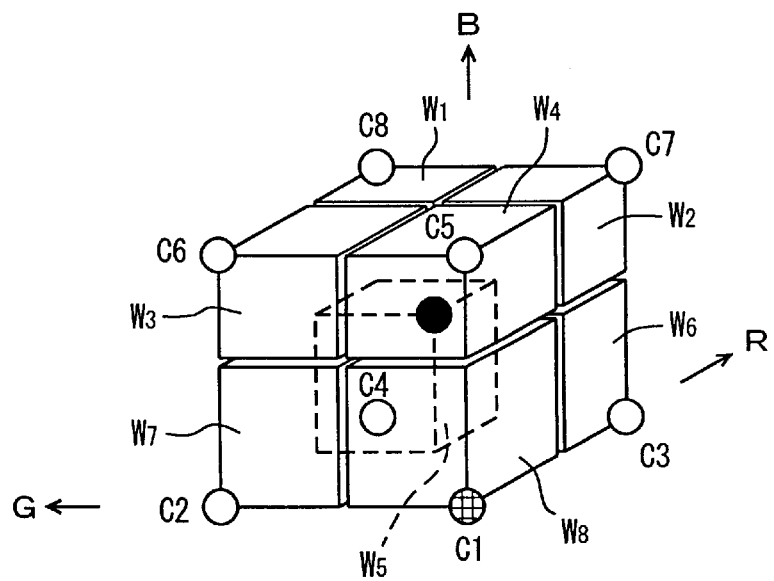
FIG. 23 is a diagram for representing the concept of a weighting coefficient in performing an 8-point interpolation operation.

FIG. 20 is a block diagram showing a configuration of a computer executing such a program as described above. With reference to the figure, the computer includes a CPU 601 generally controlling the apparatus, a display 605, a local area network (LAN) card 607 or (a modem card) providing a connection to a network, an external communication and the like, an input unit 609 configured of a keyboard, a mouse and the like, a floppy disk drive 611, a CD-ROM drive 613, a hard disk drive 615, a RAM 617 and a ROM 619.

CPU 601, corresponding to a computer, can be driven by a program recorded in a floppy disk F, a CD-ROM 613a or any other similar recording medium. This program is transmitted from the recording medium to a RAM or any other similar recording medium and recorded therein. Note that the program may be recorded in a hard disk, a ROM, a RAM, a memory card or any other similar recording medium and thus provided to users. Alternatively, it may be downloaded to a computer externally from the Internet or any other similar network and executed by the computer.

The computer receives image data for example via a scanner and uses the process of the present invention to convert the input image data in color and outputs the converted data to a printer or the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A color conversion device comprising:
   a color conversion means for receiving input of image data represented in a first color space to output a plurality of color converted data represented in a second color space;
   an interpolation block for using said color-converted data to perform an interpolation operation to obtain output image data represented in said second color space and corresponding to said image data input;
   a first determination block for determining a saturation level of said image data input; and
   a modification block for modifying a level of contribution of said plurality of color-converted data to said interpolation operation, based on a determination result of said first determination block.

2. The device of claim 1, wherein:
   said first determination block determines whether said image data input has a saturation level no less than a first threshold value; and
   said modification block reduces said level of contribution of color-converted data having a low saturation level among said plurality of color-converted data when said first determination block determines that said image data input has a saturation level no less than said first threshold value.

3. The device of claim 2, wherein said modification block nulls said level of contribution of said color-converted data having a low saturation level when said first determination block determines that said image data input has a saturation level no less than said first threshold value.

4. The device of claim 2, further comprising a second determination block for determining a level in lightness of said image data input, wherein said modification block reduces said level of contribution of color-converted data having a high level in lightness among said plurality of color-converted data when said first determination block determines that said image data input has a saturation level no less than said first threshold value and said second determination block determines that said image data input has a level in lightness no less than a second threshold value, and wherein said modification block reduces said level of contribution of color-converted data having a low level in lightness among said plurality of color-converted data when said first determination block determines that said image data input has a saturation level no less than said first threshold value and said second determination block determines that said image data input has a level in lightness less than said second threshold value.

5. The device of claim 4, wherein said modification block nulls said level of contribution of said color-converted data having a high level in lightness when said first determination block determines that said image data input has a saturation level no less than said first threshold value and said second determination block determines that said image data input has a level in lightness no less than said second threshold value, and wherein said modification block nulls said level of contribution of said color-converted data having a low level in lightness when said first determination block determines that said image data input has a saturation level no less than said first threshold value and said second determination block determines that said image data input has a level in lightness less than said second threshold value.

6. The device of claim 1, wherein:
   said first determination block determines whether said image data input has a saturation level no more than a second threshold value; and
   said modification block nulls said level of contribution of color-converted data having a high saturation level among said plurality of color-converted data when said first determination block determines that said image data input has a saturation level no more than said second threshold value.

7. The device of claim 6, wherein said modification block modifies said level of contribution to permit color-converted data having a saturation level of zero among said plurality of color-converted data to contribute to said interpolation operation when said first determination block determines that said image data input has a saturation level no more than said second threshold value.

8. The device of claim 1, wherein said color conversion means is a three-dimensional lookup table having said color-converted data stored therein in a form of data represented in said second color space and corresponding to each lattice point of a three-dimensional lattice dividing said first color space, said three-dimensional lookup table receiving input of image data represented in said first color space to output a plurality of color-converted data corresponding to each lattice point of a cube containing said image data input.

9. A color conversion method comprising the steps of:
(1) obtaining, based on image data input represented in a first color space, a plurality of color-converted data corresponding to said image data input and represented in a second color space;
(2) determining a saturation level of said image data input;
(3) modifying, based on a result of step (2), a level of contribution of said plurality of color-converted data to an interpolation operation; and
(4) using said color-converted data having a modified level of contribution, to perform said interpolation to obtain image data output represented in said second color space and corresponding to said image data input represented in said first color space.

10. The method of claim 9, wherein when a decision is made in step (2) that said image data input has a saturation level no less than said first threshold value, said color-converted data having a low saturation level has its level of contribution reduced in step (3).

11. The method of claim 10, wherein when a decision is made in step (2) that said image data input has a saturation level no less than said first threshold value, said color-converted data having a low saturation level has its level of contribution nulled in step (3).

12. The method of claim 10, step (2) further including determining a level in lightness of said image data input, wherein when a decision is made in step (2) that said image data input has a saturation level no less than said first threshold value and a decision is made in step (2) that said image data input has a level in lightness no less than a second threshold value said color-converted data having a high level in lightness has its level of contribution reduced in step (3), and wherein when a decision is made in step (2) that said image data input has a saturation level no less than said first threshold value and a decision is made in step (2) that said image data input has a level in lightness less than said second threshold value said color-converted data having a low level in lightness has its level of contribution reduced in step (3).

13. The method of claim 12, wherein when a decision is made in step (2) that said image data input has a saturation level no less than said first threshold value and a decision is made in step (2) that said image data input has a level in lightness no less than said second threshold value said color-converted data having a high level in lightness has its level of contribution nulled in step (3), and wherein when a decision is made in step (2) that said image data input has a saturation level no less than said first threshold value and a decision is made in step (2) that said image data input has a level in lightness less than said second threshold value said color-converted data having a low level in lightness has its level of contribution nulled in step (3).

14. The method of claim 9, wherein when a decision is made in step (2) that said image data input has a saturation level no more than said second threshold value, said color-converted data having a high saturation level has its level of contribution nulled in step (3).

15. The method of claim 14, wherein when a decision is made in step (2) that said image data input has a saturation level no more than said second threshold value, said level of contribution is modified in step (3) to permit only said color-converted data having a saturation level of zero of said plurality of color-converted data to contribute to said interpolation operation.

16. The method of claim 9, wherein step (1) uses a three-dimensional lookup table having said color-converted data stored therein in a form of data represented in said second color space and corresponding to each lattice point of a three-dimensional lattice dividing said first color space, said three-dimensional lookup table receiving input of image data represented in said first color space to output a plurality of color-converted data corresponding to each lattice point of a cube containing said image data input.

17. A program converting image data represented in a first color space to image data represented in a second color space, said program causing a computer to execute a process comprising the steps of:
(1) obtaining, based on image data input represented in a first color-space, a plurality of color-converted data corresponding to said image data input and represented in a second color space;
(2) determining a saturation level of said image data input;
(3) modifying, based on a result of step (2), a level of contribution of said plurality of color-converted data to an interpolation operation; and
(4) using said color-converted data having a modified level of contribution, to perform said interpolation to obtain image data output represented in said second color space and corresponding to said image data input represented in said first color space.

18. The program of claim 17, wherein when a decision is made in step (2) that said image data input has a saturation level no less than a first threshold value, said color-converted data having a low saturation level has its level of contribution reduced in step (3).

19. The program of claim 18, wherein when a decision is made in step (2) that said image data input has a saturation level no less than said first threshold value, said color-converted data having a low saturation level has its level of contribution nulled in step (3).

20. The program of claim 18, step (2) further including determining a level in lightness of said image data input, wherein when a decision is made in step (2) that said image data input has a saturation level no less than said first threshold value and a decision is made in step (2) that said image data input has a level in lightness no less than a second threshold value, said color-converted data having a high level in lightness has its level of contribution reduced in step (3), and wherein when a decision is made in step (2) that said image data input has a saturation level no less than said first threshold value and a decision is made in step (2) that said image data input has a level in lightness less than said second threshold value, said color-converted data having a low level in lightness has its level of contribution reduced in step (3).

21. The program of claim 20, wherein when a decision is made in step (2) that said image data input has a saturation level no less than said first threshold value and a decision is made in step (2) that said image data input has a level in lightness no less than said second threshold value, said color-converted data having a high level in lightness has its level of contribution nulled in step (3), and wherein when a decision is made in step (2) that said image data input has a saturation level no less than said first threshold value and a decision is made in step (2) that said image data input has a level in lightness less than said second threshold value, said color-converted data having a low level in lightness has its level of contribution nulled in step (3).

22. The program of claim 17, wherein when a decision is made in step (2) that said image data input has a saturation level no more than said second threshold value, said color-converted data having a high saturation level has its level of contribution nulled in step (3).

23. The program of claim 22, wherein when a decision is made in step (2) that said image data input has a saturation level no more than said second threshold value, said level of contribution is modified in step (3) to allow only said color-converted data having a saturation level of zero to contribute to said interpolation operation.

24. The program of claim 17, wherein step (1) uses a three-dimensional lookup table having said color-converted data stored therein in a form of data represented in said second color space and corresponding to each lattice point of a three-dimensional lattice dividing said first color space, said three-dimensional lookup table receiving input of image data represented in said first color space to output a plurality of color-converted data corresponding to each lattice point of a cube containing said image data input.

25. A color conversion device comprising:
   a three-dimensional lookup table having color-converted data stored therein a form of data corresponding each lattice point of a three-dimensional lattice dividing a first color space, and represented in a second color space, said three-dimensional lookup table receiving input of image data represented in said first color space to output a plurality of color-converted data corresponding to each lattice point of a cube containing said image data input;
   a first determination block for determining a saturation level of said image data input;
   a selector for selecting a predetermined interpolation coefficient based on a determination result of said first determination block; and
   an interoperation block for using said interpolation coefficient selected by said selector and said plurality of color-converted data output from said three-dimensional lookup table, to perform an interpolation operation to obtain output image data represented in said second color space and corresponding to said image data input.

26. The device of claim 25, wherein:
   said first determination block determines whether said image data input has a saturation level no less than a first threshold value; and
   said selector selects an interpolation coefficient to cause color-converted data corresponding to a lattice point having a low saturation level among said plurality of color-converted data to have a reduced level of contribution to said interpolation operation when said first determination block determines that said image data input has a saturation level no less than said first threshold value.

27. The device of claim 26, wherein said selector selects an interpolation coefficient to cause said color-converted data corresponding to a lattice point having a low saturation level to have a zero level of contribution to said interpolation operation when said first determination block determines that said image data input has a saturation level no less than said first threshold value.

28. The device of claim 26, further comprising a second determination block for determining a level in lightness of said image data input, wherein said selector selects an interpolation coefficient to cause color-converted data corresponding to a lattice point having a high level in lightness among said plurality of color-converted data to have a reduced level of contribution to said interpolation operation when said first determination block determines that said image data input has a saturation level no less than said first threshold value and said second determination block determines that said image data input has a level in lightness no less than a second threshold value, and wherein said selector selects an interpolation coefficient to cause color-converted data corresponding to a lattice point having a low level in lightness among said plurality of color-converted data to have a reduced level of contribution to said interpolation operation when said first determination block determines that said image data input has a saturation level no less than said first threshold value and said second determination block determines that said image data input has a level in lightness than said second threshold value.

29. The device of claim 28, wherein said selector selects an interpolation coefficient to cause said color-converted data corresponding to a lattice point having a high level in lightness to have a zero level of contribution to said interpolation operation when said first determination block determines that said image data input has a saturation level no less than said first threshold value and said second determination block determines that said image data input has a level in lightness no less than said second threshold value, and wherein said selector selects an interpolation coefficient to cause said color-converted data corresponding to a lattice point having a low level in lightness to have a zero level of contribution to said interpolation operation when said first determination block determines that said image data input has a saturation level no less than said first threshold value and said second determination block determines that said image data input has a level in lightness less than said second threshold value.

30. The device of claim 25, wherein:
   said first determination block determines whether said image data input has a saturation level no more than a second threshold value; and
   said selector selects an interpolation coefficient to allow only color-converted data corresponding to a lattice point having a saturation level of zero among said plurality of color-converted data to contribute to said interpolation operation when said first determination block determines that said image data input has a saturation level no more than said second threshold value.

31. The device of claim 30, wherein said first color space is a VCrCb color space, and wherein said selector selects an interpolation coefficient to allow only color-converted data corresponding to a lattice point located on a gray axis of said first color space among said plurality of color-converted data to contribute to said interpolation operation when said first determination block determines that said image data input has a saturation level no more than said second threshold value.

* * * * *